United States Patent
Ghanem et al.

(10) Patent No.: US 12,380,674 B2
(45) Date of Patent: Aug. 5, 2025

(54) VEHICLE REIDENTIFICATION

(71) Applicant: UT-Battelle, LLC, Oak Ridge, TN (US)

(72) Inventors: Sally S. Ghanem, Oak Ridge, TN (US); Ryan A. Kerekes, Oak Ridge, TN (US); Ryan A. Tokola, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 363 days.

(21) Appl. No.: 18/139,172

(22) Filed: Apr. 25, 2023

(65) Prior Publication Data
US 2023/0343065 A1    Oct. 26, 2023

Related U.S. Application Data

(60) Provisional application No. 63/334,688, filed on Apr. 26, 2022.

(51) Int. Cl.
*G06V 10/80* (2022.01)
*G06V 10/74* (2022.01)
*G06V 10/82* (2022.01)

(52) U.S. Cl.
CPC ............ *G06V 10/761* (2022.01); *G06V 10/80* (2022.01); *G06V 10/82* (2022.01)

(58) Field of Classification Search
CPC ...... G06V 10/761; G06V 10/80; G06V 10/82; G06V 10/454; G06V 2201/08
See application file for complete search history.

(56) References Cited

PUBLICATIONS

Wu et al, Detecting Owner-member Relationship with Graph Convolution Network in Fisheye Camera System, 2022, arXiv: 2201.12099v1, pp. 1-7. (Year: 2022).*
Lin et al, Investigating 3D Model and Part Information for Improving Content-Based Vehicle Retrieval, 2012, IEEE Transactions on Circuits and Systems for Video Technology, 23(3): 401-413. (Year: 2012).*
Shinozuka et al, Vehicle make and model recognition by keypoint matching of pseudo frontal view, 2013, IEEE International Conference on Multimedia and Expo Workshops, pp. 1-7. (Year: 2013).*
Kang et al, Application of deep metric learning in the verification process of wheel design similarity: Hyundai motor company case, 2023, AI Magazine 44(4) 1-13. (Year: 2023).*

(Continued)

*Primary Examiner* — Kathleen M Broughton
(74) *Attorney, Agent, or Firm* — Warner Norcross + Judd LLP

(57) ABSTRACT

A framework for decision fusion utilizing features extracted from vehicle images and their detected wheels. Siamese networks are exploited to extract key signatures from pairs of vehicle images. The present disclosure melds different types of similarity scores (whole vehicle and wheels/hubcaps) between target and test vehicles to robustly integrate different similarity scores and provide a more informed decision for vehicle matching. The present disclosure provides improved accuracy for side-view vehicle matching even under different illumination conditions and elevation angles.

20 Claims, 10 Drawing Sheets
(9 of 10 Drawing Sheet(s) Filed in Color)

(56) References Cited

PUBLICATIONS

Wang, H. et al., "Local Feature-Aware Siamese Matching Model for Vehicle Re-Identification", Applied Sciences, vol. 10(7), Apr. 2020, pp. 1-15.
Shen, Y. et al., "Learning Deep Neural Networks for Vehicle Re-ID with Visual-spatio-temporal Path Proposals", Proceedings of the IEEE International Conference on Computer Vision, 2017, pp. 1900-1909.
Wang, Z. et al., "Orientation Invariant Feature Embedding and Spatial Temporal Regularization for Vehicle Re-identification", Proceedings of the IEEE International Conference on Computer Vision, 2017, pp. 379-387.
He, B. et al., "Part-regularized Near-duplicate Vehicle Re-identification", Proceedings of the IEEE International Conference on Computer Vision, 2019, pp. 3997-4005.
De Oliveira, I. et al., "A Two-Stream Siamese Neural Network for Vehicle Re-identification by Using Non-Overlapping Cameras", Proceedings of the IEEE International Conference on Computer Vision, 2019, pp. 669-673.
Wei, X. et al., "Coarse-to-fine: A RNN-based hierarchial attention model for vehicle re-identification", downloaded at arXiv.org, Dec. 2018, pp. 1-16.
Wang, H. et al., "Fusing Heterogeneous Data: A Case for Remote Sensing and Social Media", IEEE Transactions on Geoscience and Remote Sensing, vol. 56, No. 12, Dec. 2018, pp. 6956-6968.
Ghanem, S. et al., "Information Subspace-Based Fusion for Vehicle Classification", 26th European Signal Processing Conference, 2018, pp. 1612-1616.
Ghanem, S. et al., "Latent code-based fusion: A Volterra neural network approach", Intelligent Systems with Applications, vol. 18, Mar. 2023, pp. 1-9.
Xu, L. et al., "Methods of Combining Multiple Classifiers and Their Applications to Handwriting Recognition", IEEE Transactions on Systems, Man, and Cybernetics, vol. 22, No. 3, May/Jun. 1992, pp. 418-435.
Hellwich, O. et al., "Object Extraction from High-Resolution Multisensor Image Data", published on ResearchGate, Nov. 1999, pp. 1-12.
Hall, D. et al., "An Introduction to Multisensor Data Fusion", Proceedings of the IEEE, vol. 85, No. 1, Jan. 1997, pp. 6-23.
Khaleghi, B. et al., "Multisensor data fusion: A review of the state-of-the-art", published on Elsevier B.V., Aug. 2011, pp. 1-17.
Dempster, A., "A Generalization of Bayesian Inference", Journal of the Royal Statistical Society, Series B (Methodological), 1968, vol. 31, No. 2, 1968, pp. 205-247.
Atitallah, S.B., "Fusion of convolutional neural networks based on Dempster-Shafer theory for automatic pneumonia detection from chest X-ray images", International Journal of Imaging Systems and Technology, Sep. 2021, pp. 658-672.
Buede, D., "A Target Identification Comparison of Bayesian and Dempster-Shafer Multisensor Fusion", IEEE Transactions on Systems, Man, and Cybernetics, Part A: Systems and Humans, vol. 27, No. 5, Sep. 1997, pp. 569-577.
Hou, T. et al., "Vehicle Matching and Recognition under Large Variations of Pose and Illumination", IEEE Computer Society Conference on Computer Vision and Pattern Recognition Workshops, 2009, pp. 24-29.
Jelaca, V. et al., "Vehicle matching in smart camera networks using image projection profiles at multiple instances", Image and Vision Computing, vol. 31, 2013, pp. 673-685.
Zeng, N. et al., "Vehicle Matching Using Color", IEEE Proceedings of Conference on Intelligent Transportation Systems, 1997, pp. 206-211.
Bromley, J. et al., "Signature Verification using a "Siamese" Time Delay Neural Network", International Journal of Pattern Recognition and Artificial Intelligence, vol. 7, No. 4, 1993, pp. 737-744.
Sandler, M. et al., "MobileNetV2: Inverted Residuals and Linear Bottlenecks", IEEE/CVF Conference on Computer Vision and Pattern Recognition, Jun. 2018, pp. 4510-4520.
Lin, T. et al., "Microsoft COCO: Common Objects in Context", published at arXiv, 2014, pp. 1-15.
Kingma, D., "Adam: A Method for Stochastic Optimization", International Conference on Learning Representations, 2015, pp. 1-15.

\* cited by examiner

TWO VEHICLE IMAGES AND THEIR DETECTED WHEELS

VEHICLE REIDENTIFICATION

This invention was made with government support under Contract No. DE-AC05-00OR22725 awarded by the U.S. Department of Energy. The government has certain rights in the invention.

BACKGROUND OF THE INVENTION

The present invention relates to computer vision, machine learning, data structures, and data fusion. The present invention also relates to vehicle identification and its applications in a wide array of technologies, such as real-time transportation technologies (e.g., safety, surveillance, security, and robotics technologies).

Data fusion is a topic in machine learning that can provide complimentary information and enhance the understanding of data structures. Multi-modal data has become more widely available due to advances in sensor development. While data fusion is not a new topic, it has recently witnessed a considerable increase in the demand for foundational principles for different applications. There are three levels of data fusion to consider, namely, data fusion, feature fusion, and decision fusion. Data fusion involves integrating unprocessed data generated by each sensor. In feature fusion, features are extracted from raw data, collected from various sensors, and combined to construct a better feature. Decision fusion, in contrast, optimally combines the decisions reached by different algorithms or sensors to yield a more informed decision.

The topic of vehicle re-identification has been studied extensively in literature. For example, the literature has proposed a local feature-aware model for vehicle re-identification. Given multi-view images of a target vehicle, this approach focuses on learning informative parts that are most likely to differ among vehicles. However, this approach does not perform well on images with a dim background. Additionally, this approach cannot achieve effective identification in the case of only different views of two cars or in the absence of shared parts in the two cars. Elsewhere in literature, a spatiotemporal approach for vehicle re-identification has been adopted. For example, a part-regularized discriminative feature preserving method has been proposed that enhances the ability to perceive subtle discrepancies. That approach utilized three vehicle parts for detection: lights, including front light and back light; windows including front window and back window; and vehicle brand. Elsewhere in literature, a two-stream Siamese neural network has been presented that used both the vehicle shape and license plate information for vehicle re-identification. Elsewhere in literature, an end-to-end RNN-based hierarchical attention (RNN-HA) classification model for vehicle re-identification has been proposed. That RNN-based module models the coarse-to-fine category hierarchical dependency to effectively capture subtle visual appearance cues, such as customized paint and windshield stickers.

The topic of multi-modal data fusion has been extensively studied in computer vision. Laying out the fundamentals for data fusion has become crucial for many applications, including target recognition, handwriting analysis, and image fusion.

Decision fusion techniques can be classified based on the fusion type. The most popular fusion type is voting-based, which includes majority voting, weighted voting, and Borda count, which sums the reverse ranks to perform decision fusion. Other voting techniques are probability-based, such as Bayesian inference and Dempster-Shafer fusion. A limitation common to probability-based methods is they typically require prior information about sensors' decisions or demand high computational complexity. As a result, their adoption in decision fusion in real-time applications has been negatively impacted.

Developing real-time transportation technologies remains a crucial topic for safety, surveillance, security, and robotics. Decisions regarding traffic flow and surveillance need to be performed in real time to detect potential threats and act accordingly. Computer vision systems can be employed to automatically match and track vehicles of interest. For example, in some known systems, a robust framework for matching vehicles with highly varying poses and illumination conditions has been developed. Moreover, elsewhere, a low complexity method for vehicle matching has been proposed that is robust to appearance changes and inaccuracies in vehicle detection. The latter approach represented vehicle appearances using signature vectors and compared them using a combination of 1D correlations. A vehicle matching algorithm was also proposed that identified the same vehicle in different camera sites using color information. That matching approach took advantage of road color variation to model changes in illumination to compensate for color variation and reduce the false positive matches. Ultimately, these proposed algorithms lack the desired consistency and accuracy for desired vehicle re-identification applications.

SUMMARY OF THE INVENTION

Some embodiments of the present disclosure provide a principled decision fusion framework for vehicle matching using convolutional neural networks. In one embodiment, a decision fusion framework leverages a neural network structure to mitigate the need for prior knowledge or assumptions about the classifiers.

In one embodiment of the present disclosure, features from vehicle side-view images and their corresponding wheels are extracted using Siamese networks. Pattern information specific to the wheels supplements information about the vehicles based on the whole vehicle images allowing two otherwise identical vehicles of the same make, model, and color to be distinguished or matched based on their wheels and/or hubcaps. The systems and methods can operate under various illumination conditions and elevation angles. Individual similarity scores can be combined, which are derived from features extracted from either the whole-vehicle images or from cropped images of their wheels. Integration of the individual scores enhances overall matching accuracy; thus, an overall similarity score is reached by a joint aggregation of the whole-vehicle and wheel similarity scores.

The present disclosure provides a system for matching vehicles. The system includes a hardware processor configured to: access an image that shows a side of a target vehicle, detect in the side image of the target vehicle a front wheel and a back wheel, and form corresponding images of the wheels of the target vehicle. The hardware processor can also be configured to receive one or more images, each image showing a side of a respective vehicle, and for each image the hardware processor can be configured to compare the side image of the vehicle and the side image of the target vehicle using a whole vehicle matching network to produce a whole-vehicle similarity score. Further, the hardware processor can also be configured to detect in the side image of the vehicle a front wheel and a back wheel, and form corresponding images of the wheels of the vehicle, compare the image of the vehicle front wheel and the image of the target vehicle front wheel using a front wheel matching network to produce a front wheel similarity score, and compare the image of the vehicle back wheel and the image of the target vehicle back wheel using a back wheel matching network to produce a back wheel similarity score. The hardware processor can also combine the whole-vehicle similarity score with the front wheel similarity score and the back wheel similarity score to produce an overall similarity score, and determine whether the vehicle matches the target vehicle if the overall similarity score meets a predetermined target.

In some embodiments, the hardware processor can be configured to compute an average of the whole vehicle similarity score and the front wheel similarity score and the back wheel similarity score. Alternatively or in addition, the hardware processor can be configured to compute a weighted average of the whole vehicle similarity score and the front wheel similarity score and the back wheel similarity score.

The whole vehicle matching network used by the hardware processor can include a Siamese network. Further, the hardware processor can be configured to train and operate the whole vehicle matching network. The Siamese whole vehicle matching network can include two identical branches each having a plurality of layers with rectified linear activation functions where a max pooling step is applied after each of the plurality of layers. Further, the network can include a differencing phase where the outputs of the two branches are subtracted from each other to generate a differenced output. That differenced output can be input into a matching component including multiple layers with rectified linear activation functions that operates on the differenced output to generate a similarity score.

The front wheel matching network and the back wheel matching network used by the hardware processor can both be Siamese networks (or a single Siamese network). The hardware processor can be configured to train and operate the front wheel matching network and the back wheel matching network. The front wheel matching network and back wheel matching network can be the same Siamese network that includes two identical branches each having a plurality of layers with rectified linear activation functions. The Siamese network can include a differencing phase where the outputs of the two branches are subtracted from each other to generate a differenced output. It can also include a dense layer with a sigmoid activation function that operates on the differenced output to generate a wheel similarity score.

The hardware processor can be configured to detect in vehicle side images a front wheel and a back wheel, and form corresponding wheel images by pre-process wheel locking.

The system can include one or more cameras configured to acquire the side images of the respective vehicles. The hardware processor can be configured to receive the side images of the respective vehicles from the cameras.

The system can include a storage module and a network interface configured to receive the target vehicle side image over a network, and save the target vehicle side image to the storage module. The hardware processor can be configured to save the target vehicle wheel images to the storage module. The hardware processor, the storage module, and the network interface can be disposed in a vehicle.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

This patent or application file contains at least one drawing executed in color. Copies of this patent or patent application with color drawing(s) will be provided by the Office upon request and payment of the necessary fee.

DESCRIPTION OF THE CURRENT EMBODIMENT

The present disclosure provides automated vehicle matching (also referred to as re-identification) based on side-view vehicle images. Systems and methods of the present disclosure leverage convolutional neural networks and data fusion to match (e.g., by providing a similarity score or binary decision based on a similarity score threshold) a vehicle in one image with the same vehicle shown in another image. Systems and methods of automatic vehicle matching in accordance with embodiments of the present disclosure provide enhanced accuracy by fusing whole-vehicle similarity scores and wheel similarity scores in a decision fusion network. The systems and methods of the present disclosure leverage wheel pattern information specific to the wheels that provide supplementary information about the vehicles and ultimately enhance the accuracy of the vehicle matching.

The current disclosure includes a decision fusion framework for vehicle matching that aggregates decisions from two Siamese networks handling a pair of vehicle images and their detected wheels. Integrating the decisions helps reinforce the consistency between the outputs of the matching networks. After training the vehicle and the wheel matching networks, the learned networks can be utilized to match new observed data. The present disclosure provides a significant improvement in the vehicle matching accuracy under decision fusion.

In operation, systems and method of the present disclosure provide the ability to evaluate whether multiple side-view images of a vehicle are the same vehicle. This operation can be useful in a variety of different contexts. The system and method can provide a similarity score (also referred to as a confidence value) that represents confidence that the two vehicles in the image are the same vehicle, or vice versa. That is, in some embodiments, the systems and methods of the present disclosure can be configured to provide a dis-similarity score that represents confidence that the two vehicles in the image are not the same vehicle.

The system and method can utilize thresholding to provide a binary answer to whether the two depicted vehicles are the same, or different. By leveraging convolutional neural networks and data fusion using both whole-vehicle images and wheel patterns, systems and methods in accordance with the present disclosure are capable of both distinguishing between vehicles that are extremely similar, but not the same, and also identifying two side view vehicle images are images of the same vehicle. For example, embodiments of the system and method can accurately distinguish two different trucks that are the same color, same make, and same model. That is, the system can accurately identify from the side view images whether they are different trucks or the same truck. This determination can be made accurately regardless of whether the images are captured at different times and lighting conditions.

Figure 1:
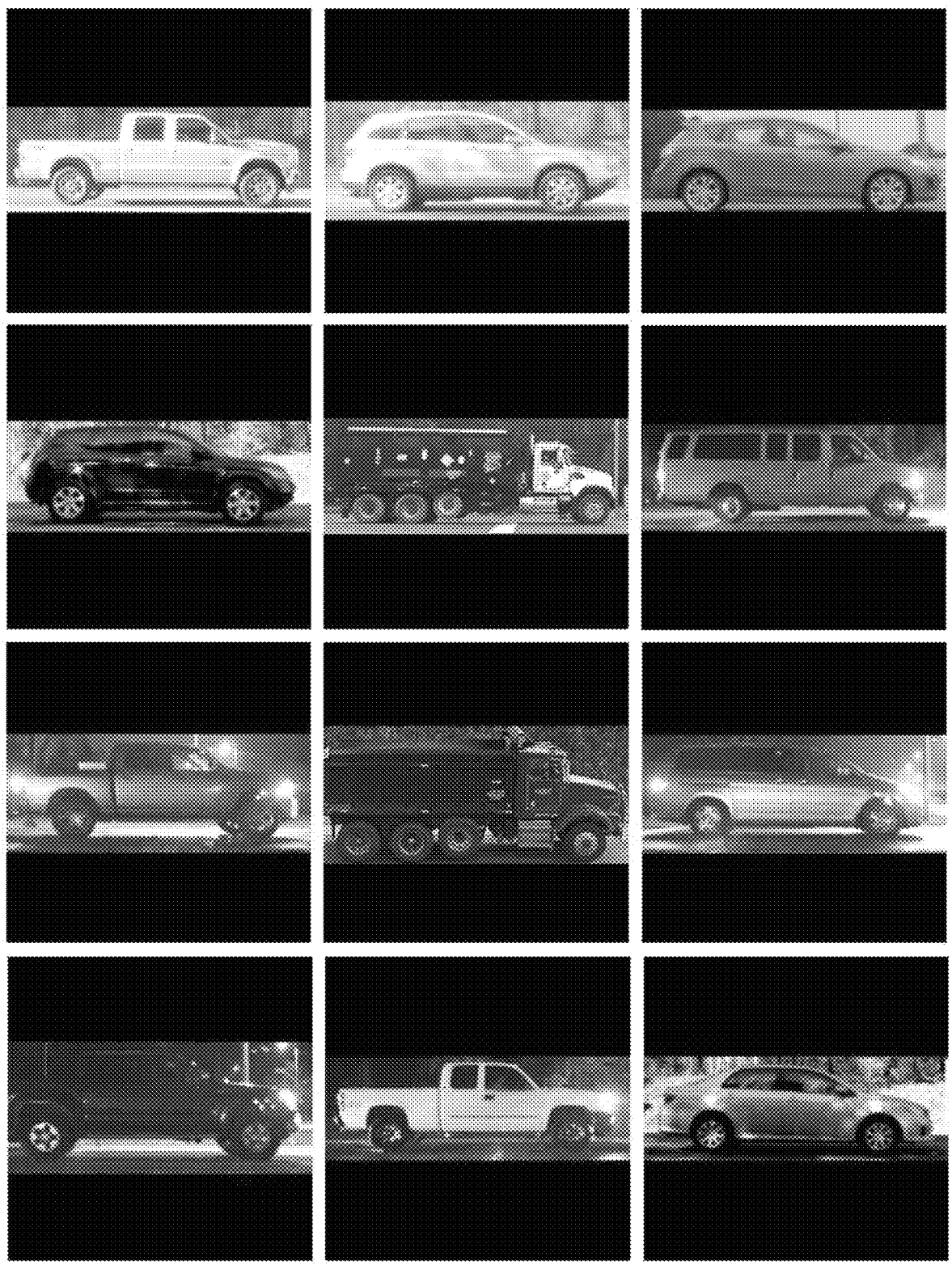
FIG. 1 illustrates exemplary side view vehicle images for use with embodiments of the present disclosure.

The systems and methods of the present disclosure utilize convolutional neural networks trained on a whole-vehicle image dataset. For example, one vehicle image dataset capable of being utilized to train and validate neural networks in the present disclosure can include hundreds of thousands of side-view vehicle images. Such a dataset can be collected as part of an embodiment of the invention or alternatively can be obtained from a public or private source. There are a number of such datasets that are publicly available. For example, the Profile Images and Annotations for Vehicle Re-identification Algorithms (PRIMAVERA) dataset is one example of such a publicly available dataset. Sample side view whole-vehicle images from the PRIMAVERA dataset are illustrated in FIG. 1.

Validation and/or training data (i.e., side view vehicle images) can be collected using a roadside sensor system containing one or more color cameras and a radar unit. For one exemplary dataset, multiple different types of cameras can be used for vehicle image collection. For example, for daytime image capture, RGB cameras equipped with either Sony IMX290 (1945×1097 pixels), IMX036 (2080×1552 pixels) sensors, or other suitable daytime cameras can be used. For low-light image capture after sunset, a Sony UMC-S3C camera or other suitable low-light camera can be used to perform high-sensitivity RGB imaging. In one exemplary embodiment, images are captured from distances to the vehicle ranging between 1 and 20 meters using 1.8 to 6 mm lenses in conjunction with the above cameras. However, these are merely exemplary camera setups and in alternative embodiments, images can be captured with different cameras and different lenses at different distances.

Essentially any suitable image pre-processing or image post-processing can be performed. In some embodiments, an un-distortion operation can be applied to each frame prior to any processing to remove distortion effects of a wide-angle lens. In alternative embodiments, such operation may be skipped or a different set of one or more suitable processing steps may be utilized on the dataset.

Images of passing vehicles can be collected over the course of several years, though the time frame of capture can vary for other datasets utilized in connection with the present disclosure. The images of the dataset can be captured during essentially any time of day. Nighttime images may be captured using a low-light color camera. Sensors can be positioned both at ground level and at an elevated angle of approximately 20 degrees from horizontal and oriented perpendicular to the road, providing a near-profile view of passing vehicles. In alternative embodiments, the positioning and orientation of the cameras can vary providing less or more perspective in the side view of the vehicle images. Twelve sample images from a dataset in accordance with the present disclosure are depicted in FIG. 1.

Where verification is desired, license plate readers can be collocated with the sensors to provide a ground-truth identity for each collected vehicle. Where verification is not desired or is unnecessary, license plate readers can be omitted from the systems and methods of the present disclosure. While license plates can be utilized to obtain ground truth data, the systems and methods vehicle re-identification or matching in accordance with the present disclosure does not rely on license plate data, but rather only a profile view of the vehicle. To the extent license plate data is captured, actual license plate numbers can be obfuscated by replacing each plate number with an arbitrary number (or another method) to use as a non-intrusive vehicle ID.

One dataset for use in connection with the present disclosure contains 636,246 images representing 13,963 vehicles. Each vehicle has a different number of images depending on the number of collected video frames and how many times it passed by one of the sensors. The dataset can be divided into training and validation sets. One exemplary dataset was separated into a training set containing 543,926 images representing 11,918 vehicles, and a validation set containing 92,320 images representing 2045 vehicles. Other datasets may have different number of images representing different numbers of vehicles. Further, the number of images in the training and validation data may be split differently.

Figure 2:
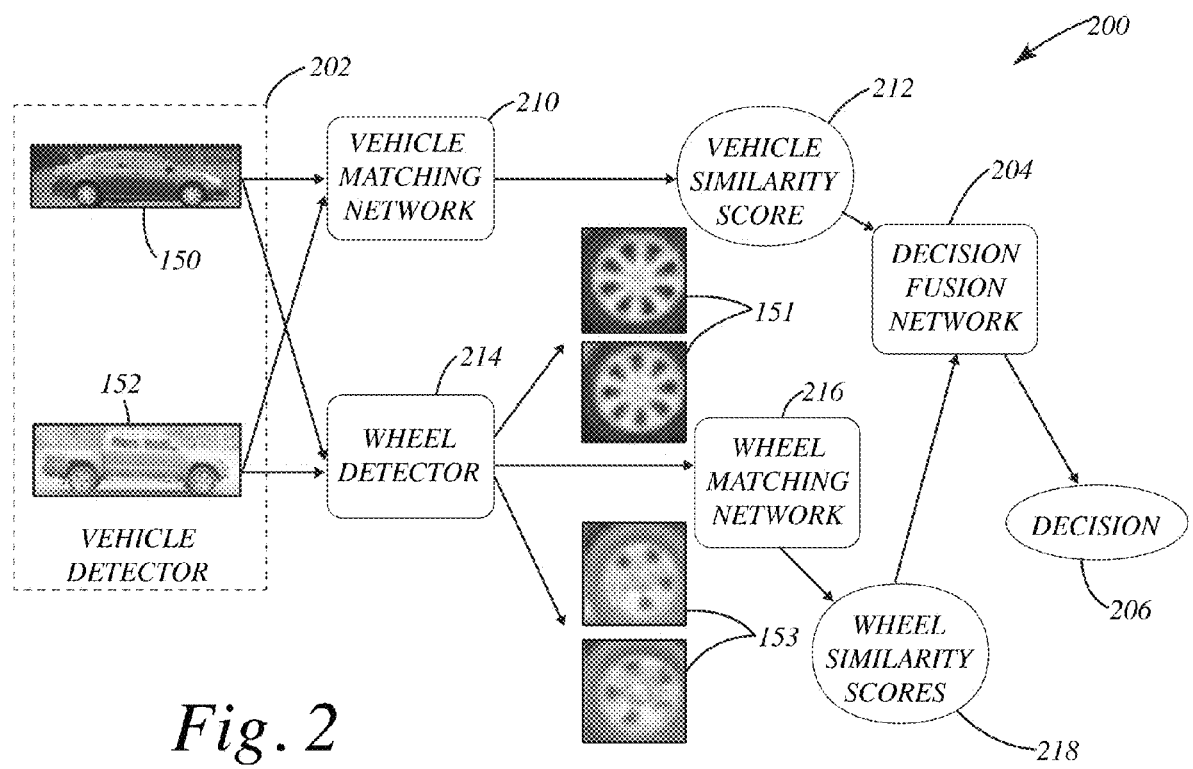
FIG. 2 illustrates a representative block diagram of one embodiment of the present disclosure.

One embodiment of a fusion-based vehicle matching algorithm 200 in accordance with the present disclosure is illustrated in FIG. 2. The fusion-based vehicle matching algorithm 200 includes two main stages. The first stage includes a whole vehicle matching network 210, which compares a pair of vehicle images 150, 152 and generates a similarity score 212. The first stage 202 also contains a wheel detector 214, which detects the outermost two wheels 151, 153 in each vehicle image 150, 152 and feeds them into the wheel matching network 216. This network 216 compares the detected wheels 154 and outputs wheel similarity scores 218. The second stage of the disclosed framework is the decision fusion network 204, which combines the vehicle similarity scores 212 and wheel matching scores 218 to obtain a more accurate and robust overall similarity score, which can be compared to a threshold to provide a fusion-based vehicle match decision 206.

The decision fusion network 204 utilizes both the vehicle similarity score 212 and the wheel similarity score 218 to provide a fused similarity score. Assume having two data points, $X_i^t$ and $X_{ii}^t \in R^{m \times n}$ that belong to class i and ii (e.g., the vehicle similarity score class and the wheel similarity score class), respectively. In addition, consider having T different modalities such that t denotes the modality index and t=1, ..., T. More precisely, consider two feature maps $x_i^t$ and $x_{ii}^t \in R^c \in Rc$ corresponding to $X_i^t$ and $X_{ii}^t$, respectively. For each modality t, a decision $D^t$ is generated such that $D^t = f(x_i^t, x_{ii}^t)$, where f is a matching function and $D^t \in R$. This approach fuses the decisions $D_{t=1}^T$ so a fusion function k: D(1), D(2), ..., D(T)→z is defined that fuses the decisions $D_{t=1}^T$ and produces a final decision z∈R. Various fusion functions can be used to combine the matching decisions from the vehicle matching network and the wheel matching network.

In this disclosure, the use of neural networks contributes to improved decision fusion and ultimately vehicle matching. In one embodiment, a multi-layered, fully connected decision fusion network 204 can be trained to combine the matching decisions and provide a unified, final ruling. To show the advantage of using a decision fusion deep learning method, the performance of the decision fusion network can be compared to other common fusion methods, such as soft voting, majority voting, and averaging the decisions. For soft voting, every individual decision is assigned a probability value. The predictions are weighted by their importance and summed up. The weight that provides the highest training accuracy wins the vote.

Details regarding how neural networks can be constructed for the disclosed framework will now be discussed in more detail.

Vehicle Detector

Figure 3:
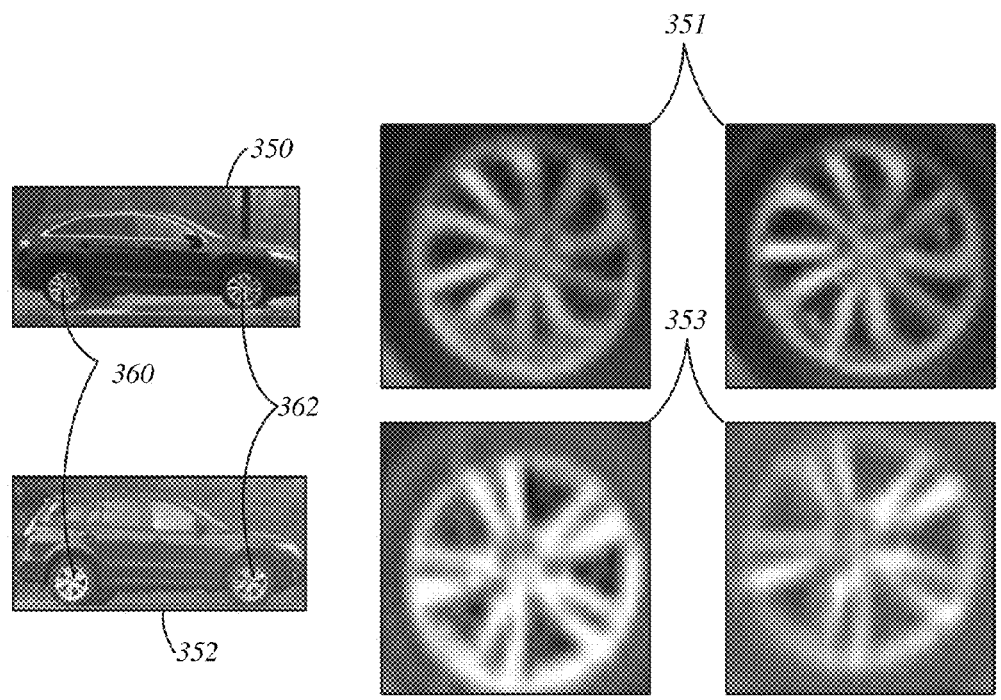
FIG. 3 illustrates two cropped whole vehicle side view images and detected cropped wheel images from the whole vehicle side view images.

FIG. 3 illustrates an exemplary pair of cropped whole vehicle images 350, 352 that can be utilized in the vehicle matching network 210, which will be discussed in more detail later, to generate vehicle similarity scores 212.

The whole-vehicle side view images 350, 352 can be provided to or obtained by the systems and methods of the present disclosure. Alternatively, systems and methods of the present disclosure can optionally include a vehicle detector 202 (see FIG. 2) that analyzes an image dataset to identify vehicles within the images (e.g., by drawing bounding boxes around the vehicle in each image and/or cropping each image to include just the whole-vehicle side view), such as the exemplary whole-vehicle side view images depicted in FIG. 1 of the PRIMAVERA dataset. A trained convolutional neural network can provide suitable performance identifying the vehicle detector 202. For example, a network in accordance with the present disclosure can identify a bounding box around the vehicle in each image or video frame.

One convolutional neural network that can provide suitable performance in this regard is the Single-Shot multibox Detection (SSD) Mobilenet v2 network. The SSD Mobilenet v2 model is a single-shot detection network developed for performing object detection. The SSD Mobilenet v2 model can be trained on a variety of different data sets in order to provide sufficient performance identifying vehicles in images. In one exemplary embodiment, the SSD Mobilenet v2 model can be trained on the Common Objects in Context (COCO) image dataset. The COCO dataset is specifically geared toward large-scale object detection and segmentation and is designed for computer vision research. It contains a wide range of object categories that are commonly found in everyday scenes, such as people, animals, vehicles, household objects, and natural scenery. It includes over 330,000 images, each labeled with object bounding boxes and segmentation masks for at least 80 object categories, as well as image captions that describe the content of the image. Although the SSD Mobilenet v2 model and the COCO dataset can be utilized to provide whole-vehicle detection, in alternative embodiments, a different model and/or dataset can be utilized to provide suitable automatic vehicle detection and segmentation.

Vehicle Matching Network

The objective of the whole vehicle matching network is to provide a similarity score 212 between any pair of vehicle images. For this purpose, a Siamese neural network can be utilized using a labeled training set. Siamese networks are a class of neural networks composed of two or more identical sub-networks. These sub-networks generally share the same parameters and weights; in addition, the weights are updated identically during training. The goal of Siamese networks is to find the similarity between the inputs through comparison of their feature signatures. One advantage of a Siamese model is that the model does not have to be updated or retrained if an object class is added to or removed from the dataset. Moreover, Siamese networks are more robust to class imbalance, as a few images per class can be sufficient for training.

In alternative embodiments, the whole vehicle matching can be performed utilizing another type of neural network suitable for a similarity-based task. For example, a relation, matching, prototypical, or other type of similarity-based task neural network can be utilized to learn a similarity metric between whole vehicle images and classify new vehicle images.

A Siamese network can be trained to match any pair of images and generate a matching score. In one embodiment, randomly generated image pairs were taken from a set of 543,926 images, which represent 11,918 vehicles, for training the network. True positive pairs were selected such that the two images were from two different passes of the vehicle, e.g., as opposed to two different image frames recorded during the same pass. One embodiment of a vehicle matching network in accordance with the present disclosure includes three main components. Alternative embodiments can have a different structure. The first component has two identical branches, and each branch has seven layers. The input to each branch is a single image that has been resized to 234×234×3. The structure of each branch is depicted in Table 1.

TABLE 1

| Layer | Structure | Activation |
|---|---|---|
| 1 | 4 × 3 × 3 | Relu |
| 2 | 8 × 3 × 3 | Relu |
| 3 | 16 × 3 × 3 | Relu |
| 4 | 32 × 3 × 3 | Relu |
| 5 | 32 × 3 × 3 | Relu |
| 6 | 32 × 3 × 3 | Relu |
| 7 | 32 × 3 × 3 | Relu |

A max-pooling step is applied after each layer.

The second part of the vehicle matching network is the differencing phase, in which the output of one branch is subtracted from the other. The third component of the network is the matching component. This part of the network consists of six layers, and it operates on the differenced input to output a similarity score between 0 and 1. The structure of the matching network is listed in Table 2.

TABLE 2

| Layer | Structure | Activation |
|---|---|---|
| 1 | 64 × 3 × 3 | Relu |
| 2 | 64 × 3 × 3 | Relu |
| 3 | 64 × 2 × 2 | Relu |
| 4 | 64 × 1 × 1 | Relu |
| 5 | 32 × 1 × 1 | Relu |
| 6 | 1 × 1 × 1 | Relu |

This vehicle network can be implemented using essentially any suitable programming language. The current embodiment of the vehicle matching network is implemented in Python using Tensorflow. An adaptive momentum-based gradient descent technique was used to minimize the loss functions and apply a learning rate of 0.005.

Figure 4:
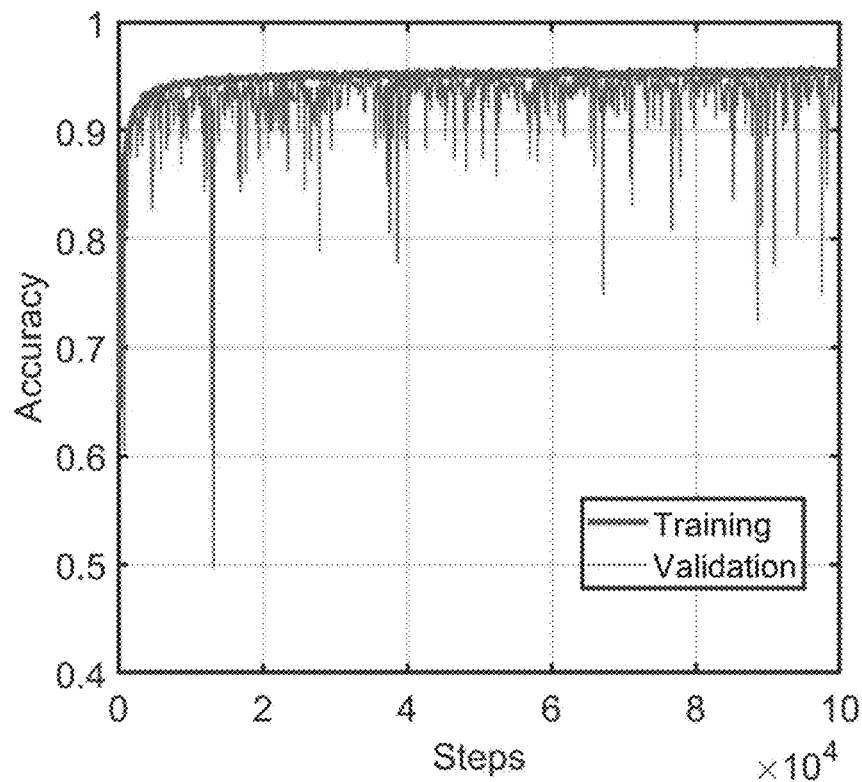
FIG. 4 illustrates a graph of a whole-vehicle matching neural network during training.

In some embodiments, a binary cross-entropy loss function can be utilized for training the vehicle matching network. A batch size of 256 can be used for the training stage. The network can be trained for a certain number of steps (e.g., 100,000 steps), and the performance on the validation set can be computed at a particular frequency (e.g., every 100 steps). To the extent desired, to assess algorithm performance over the widest variety of conditions possible, a diverse subset of the validation set can be constructed and used for validation. This subset can contain a large number of pairs of vehicle images (e.g., 12,000 pairs) collected at different locations at different times of the day and at different angles of elevation. Since the similarity score has a range of 0 to 1, a threshold of 0.5 can be applied to evaluate matching accuracy. If the matching score is more than 0.5, it indicates that the two images belong to the same vehicle, and vice versa. The training and validation performance of one embodiment of the vehicle matching network is depicted in FIG. 4. This embodiment has a training accuracy of 95.45% and a validation accuracy of 95.20%.

Figure 5:
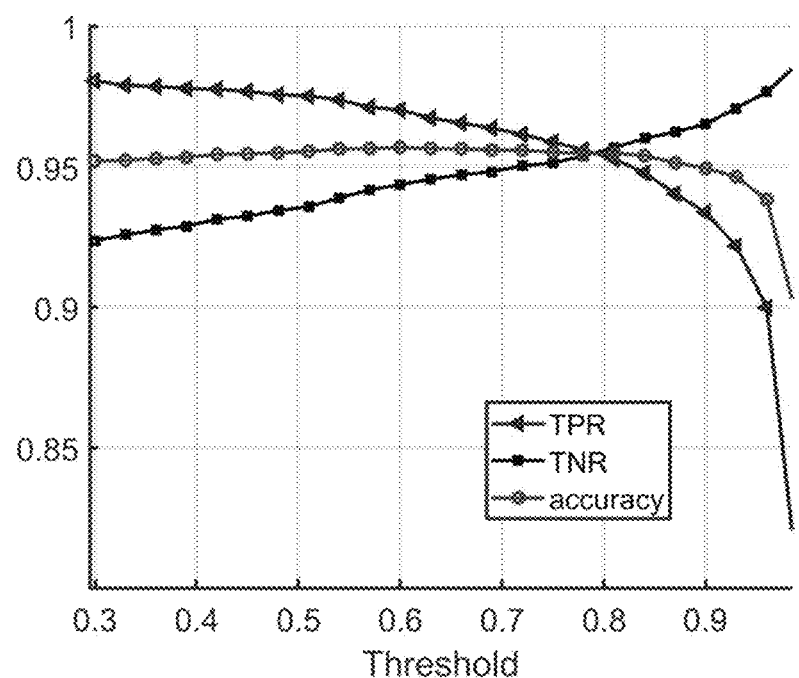
FIG. 5 illustrates a graph of vehicle matching network performance on a validation dataset with different threshold values.

As the threshold is varied, the accuracy value can change. To evaluate the performance of the vehicle matching network with different threshold values, the true positive rate (TPR), true negative rate (TNR), and matching accuracy can be computed as the threshold value is varied. Accuracy can be defined as the percent of total matches performed, e.g., including any number of positive and negative pairs, for which the algorithm produces a correct answer. The resulting curves as functions of threshold value for one embodiment are depicted in FIG. 5. From the results, a threshold value between 0.5 and 0.8 results in near-optimal accuracy. In alternative embodiments, a different threshold value may be more suitable. Further, some applications may prioritize a low false negative rate, and others may prioritize a low false positive rate; thus, it an appropriate threshold can be selected accordingly.

Wheel Detection Network

The present disclosure leverages features from vehicle wheels, such that when fused with features from whole vehicle images improvements in accuracy can be realized. In order to conduct wheel matching using a neural network, the wheels can be cropped from the whole vehicle images utilizing a wheel detector algorithm.

A trained convolutional neural network can provide suitable performance detecting wheels within in images of vehicles, such as identifying a bounding box around each wheel (or outer wheels) of each vehicle in each image or video frame. An instance of the SSD Mobilenet V2 model trained on a labeled wheel dataset can be utilized for the wheel detection. The labeled wheel training dataset can be constructed such that the wheel examples are taken from a diverse set of vehicles, e.g., sedans, SUVs, trucks, vans, and big rigs, under different lighting conditions, e.g., day, dusk, and night. Optionally, the wheel detector can be evaluated utilizing a portion of the unlabeled testing set.

In accordance with one embodiment of the present disclosure, a wheel detector 214 can be trained using a portion of the same vehicle matching network training data. In particular, wheels can be manually labeled and bounded for some (or all) of the whole-vehicle training data images. For example, in one embodiment about 4077 images were manually labeled using an image labeling program. Afterwards, a convolutional neural network, such as a Single-Shot multibox Detection (SSD) Mobilenet v2 network can be trained to detect wheels using the labeled set. For example, in one embodiment, the SSD Mobilenet v2 model can be trained on the same Common Objects in Context (COCO) image dataset. Vehicle wheels are one of the object categories in the COCO dataset and the SSD Mobilenet v2 model can be trained accordingly to identify (e.g., bound and/or crop) vehicle wheels. Although the SSD Mobilenet v2 model and the COCO dataset can be utilized to train the wheel detector, in alternative embodiments, a different model and/or dataset can be utilized to provide suitable wheel detection. FIG. 3 illustrates exemplary cropped wheel images 351, 353 output from a trained wheel detector based on the pair of whole-vehicle side view images 350, 352.

Put simply, the wheel detector can estimate the bounding boxes for the wheels and crop the wheels from the vehicle images. The detected pairs of wheels can be saved (e.g., stored and associated in a data structure) and be used to train the wheel matching network.

Wheel Locking

Some datasets (e.g., such as the PRIMAVERA dataset) includes vehicle images that have been flipped, rotated, scaled, and shifted such that the front-most and rear-most wheels are always centered on the same two-pixel locations in the image. Specifically, an image of size 234×234×3 was created such that the vehicle is facing to the right, e.g., determined by a tracking algorithm applied to the original image sequence, and the rear and front wheels are centered at pixels [164, 47] and [164, 187], respectively (see pixel locations 360, 362 in FIG. 3). This preprocessing step can be referred to as "wheel locking." By removing pose variability in the data, the neural network learns true discriminative features. For example, different hubcaps or other variance in the wheel patterns can be learned by the neural network. Wheel-locked images can be used as input to the whole-vehicle neural network.

An alternative to wheel locking that does not involve a wheel detection step is to form an input image based on the bounding box returned by an initial vehicle detector algorithm. Due to the variability in how bounding boxes are constructed, detected instances of a given vehicle may be shifted and scaled relative to one another, and any rotation of the vehicle due to sensor orientation will not be corrected. In some embodiments, such variance may be acceptable and wheel locking may be omitted.

Figure 6:
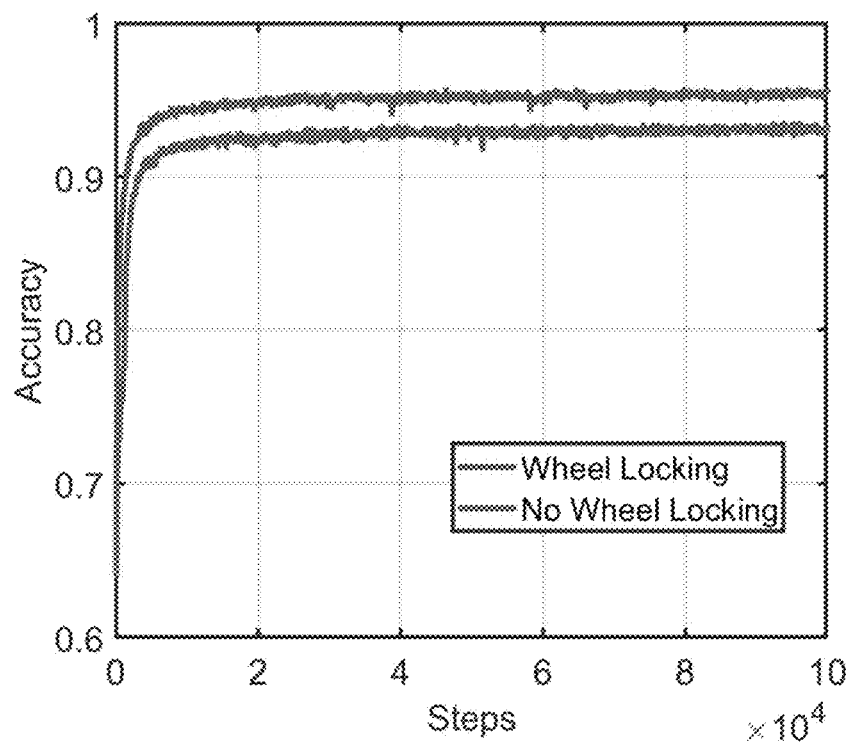
FIG. 6 illustrates a graph of training set performance showing the difference between wheel-locking and non-wheel-locking preprocessing approaches for an exemplary embodiment.
Figure 7:
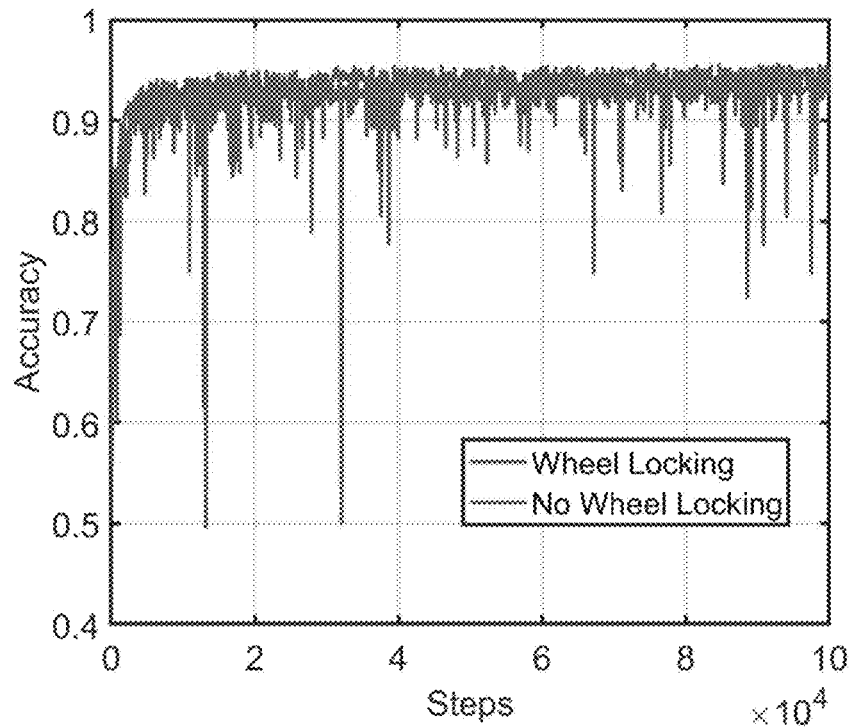
FIG. 7 illustrates a graph of validation set performance the difference between wheel-locking and non-wheel-locking preprocessing approaches for an exemplary embodiment.

The utility of the wheel-locking preprocessing step will be discussed in more detail. The validation set performance of the whole-vehicle neural network using wheel-locked images as input can be compared to when non-wheel-locked images are used as input. In both cases, image intensities can be normalized to have pixel values between 0 and 1. A comparison of training and validation set accuracy between the two preprocessing methods is shown in FIGS. 6 (training) and 7 (validation). From the results, it is apparent that locking the wheels' location across the images enhances the matching accuracy.

Wheel Matching

The detected vehicle wheels can be utilized as an additional source of information. For example, the finer details from the wheel patterns can be integrated/fused with the overall vehicle matching similarity data and thus achieve better performance in comparison to only using the whole-vehicle images by themselves. To match the wheels of each pair of vehicles, another network (e.g., a Siamese neural network) can be trained using the wheel detector images to generate wheel similarity scores.

As described above, a wheel detector can estimate the bounding boxes of wheels from each image. The cropped wheels and their labels were used to train a Siamese network. Specifically, the network can be trained using a dataset that contains a large number of wheel images (e.g., 228,120) representing a large number of unique vehicles (e.g., 11,406). The dataset set can be split into two sets: training (159,684 examples) and validation (68,436 examples).

All the wheel images can be resized to 100×100×3 pixels. Similarly, to the vehicle matching network, the wheel matching network can include two identical branches. Each branch can have rectified linear unit layers. The structure of each branch is provided in Table 3.

TABLE 3

| Layer | Structure | Activation |
|---|---|---|
| 1 | 64 × 10 × 10 | Relu |
| 2 | 128 × 7 × 7 | Relu |
| 3 | 128 × 4 × 4 | Relu |
| 4 | 256 × 4 × 4 | Relu |
| 5 | 4096 × 1 | Sigmoid |

The last layer of the Siamese network is a dense layer with 4096 neurons and a sigmoid activation function. The outputs of the two branches are then subtracted from each other and fed into the last layer, which generates the matching score. The predicted matching score is a similarity measure between 0 and 1.

The network can be trained for a number of steps (e.g., 40,000 steps) with a specific learning rate (e.g., 0.002). After the wheel similarity score is computed for any pair of wheels taken from each image, a threshold can be applied to the score. That is, the average of the back wheel similarity score and the front wheel similarity scores can each be compared to a threshold. If the average of the two-wheel matching scores is more than 0.5, then the two vehicles can be declared to be the same, and vice versa. In the current embodiment, the wheel matching network provides a matching accuracy of 96.95% for the training data and a 93.21% accuracy for the validation data.

Figure 8:
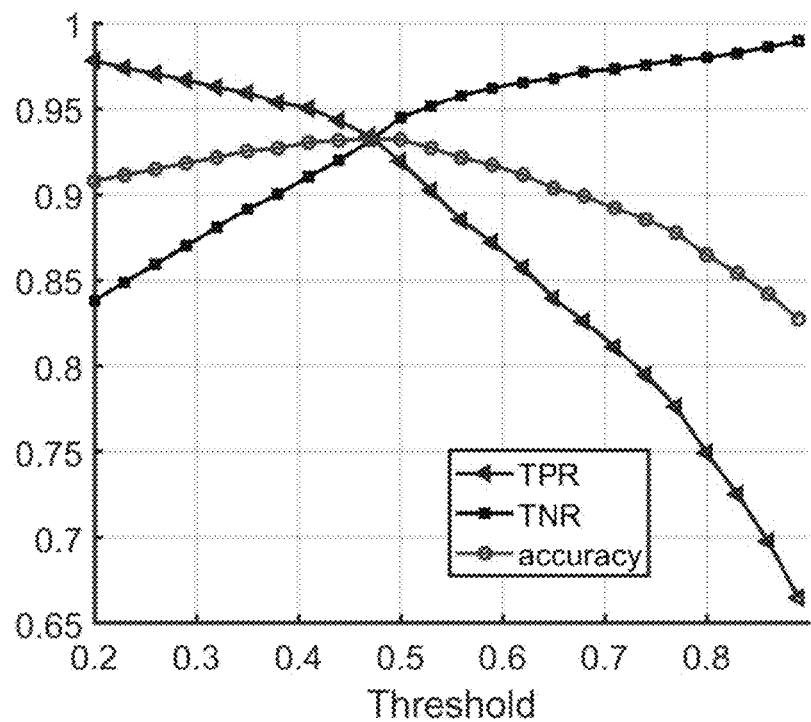
FIG. 8 illustrates a graph of wheel matching network performance in an exemplary embodiment.

FIG. 8 illustrates a graph of the true positive rate (TPR), true negative rate (TNR), and accuracy for different thresholds. In the current embodiment, a threshold value equal to 0.47 provides a suitable compromise between the error rates. In alternative embodiments, depending on the application, a different threshold value may be selected.

Decision Fusion Network

Comparing the performances of the vehicle and wheel matching networks, the vehicle matching network is more reliable and accurate than the wheel matching network. This is expected because the vehicle matching network considers the entire image and examines more aspects of the vehicle, whereas many unique vehicles may share identical or very similar wheel patterns. However, unexpectedly, combining the results from the vehicle and wheel matching networks enhances the overall matching performance.

One exemplary embodiment of a decision fusion network in accordance with the present disclosure will now be described in detail. All pairs of images go through the whole-vehicle matching network, which generates a whole-vehicle similarity score. Afterwards, the wheel detector is applied to locate and crop the wheels. After at least two wheels are detected from each image, the front wheels of the two images are compared using the wheel matching network. The back wheels are also compared using the wheel matching network. As a result, three similarity scores are generated: one whole-vehicle score and two-wheel scores. These steps are repeated for all the pairs of vehicles in the dataset.

Figure 9:
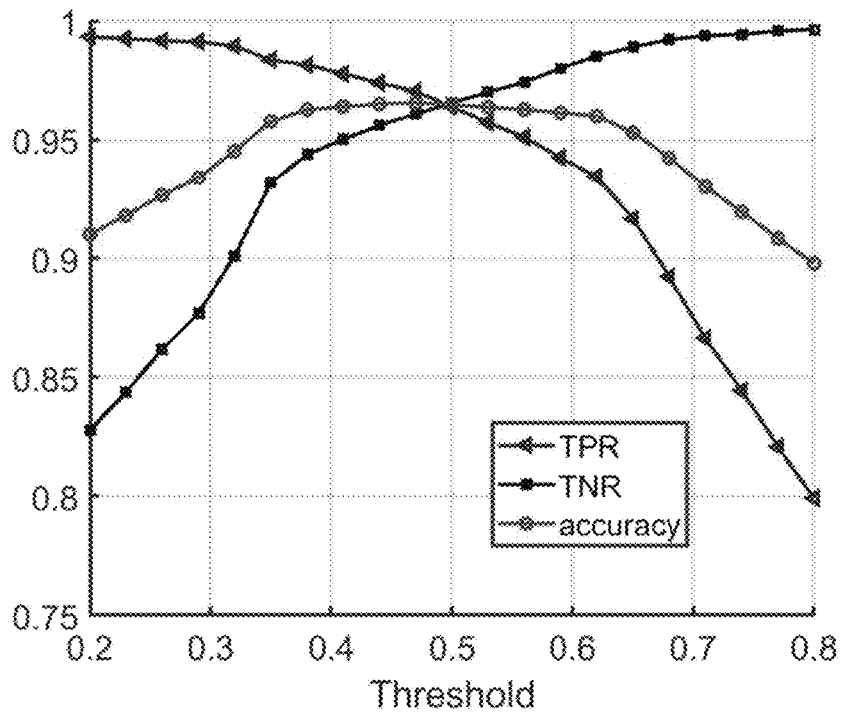
FIG. 9 illustrates a graph of decision fusion performance in an exemplary embodiment.
Figure 10:
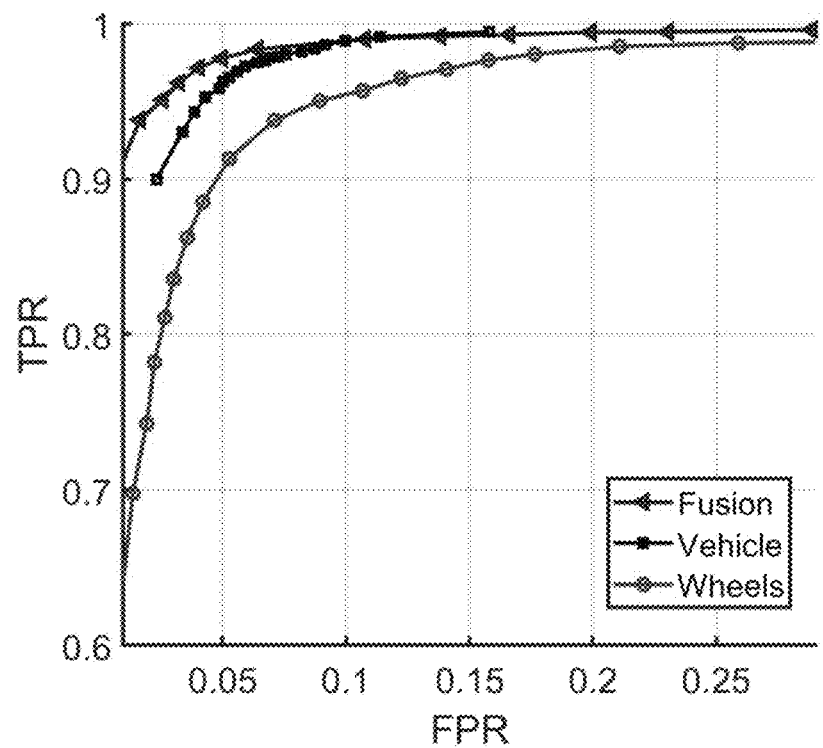
FIG. 10 illustrates a graph of receiver operating characteristic curves comparing the performances of whole-vehicle-only matching, wheels-only matching, and averaging-based decision fusion.

As a baseline for decision fusion, the average of the three matching scores can be computed. Taking the average of the scores provides a reasonable result and provides a basis of comparison for the deep fusion approach, discussed herein. In FIG. 9, the baseline performance is evaluated by varying the threshold, as done in the vehicle matching and wheel matching networks. In addition, the receiver operating characteristic curves, or ROC curves, are shown in FIG. 10. In Table 4, the testing matching accuracy is shown after applying a threshold value of 0.5 and utilizing the vehicle matching score, the wheel matching score, or both.

TABLE 4

|  | Matching Accuracy % |
| --- | --- |
| Vehicle Matching Score | 95.50 |
| Wheel Matching Score | 93.21 |
| Average | 97.63 |

Figure 11:
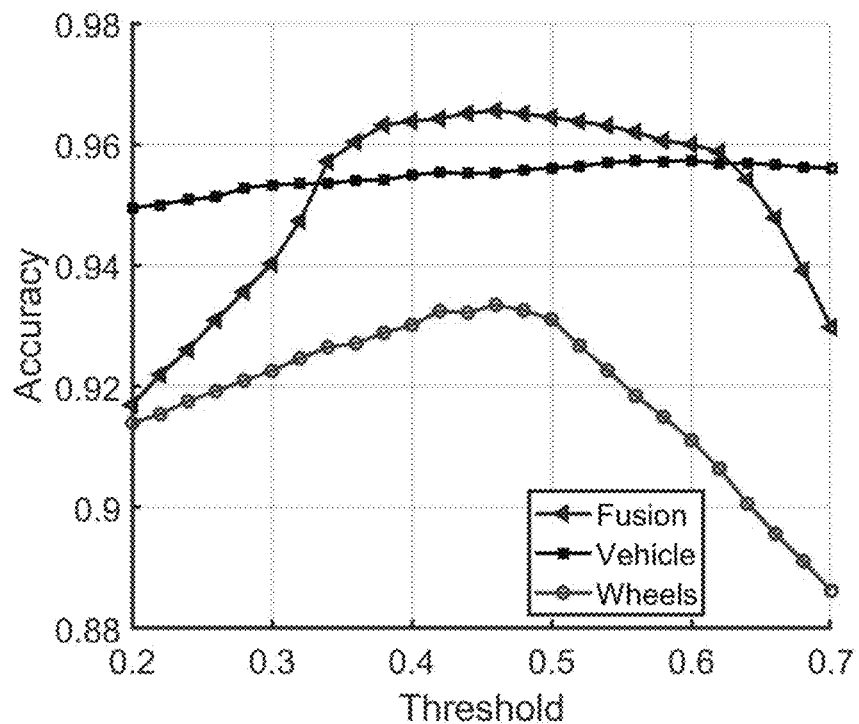
FIG. 11 illustrates a graph of baseline performance of the baseline, vehicle, and wheel-network matching accuracies.
Figure 12:
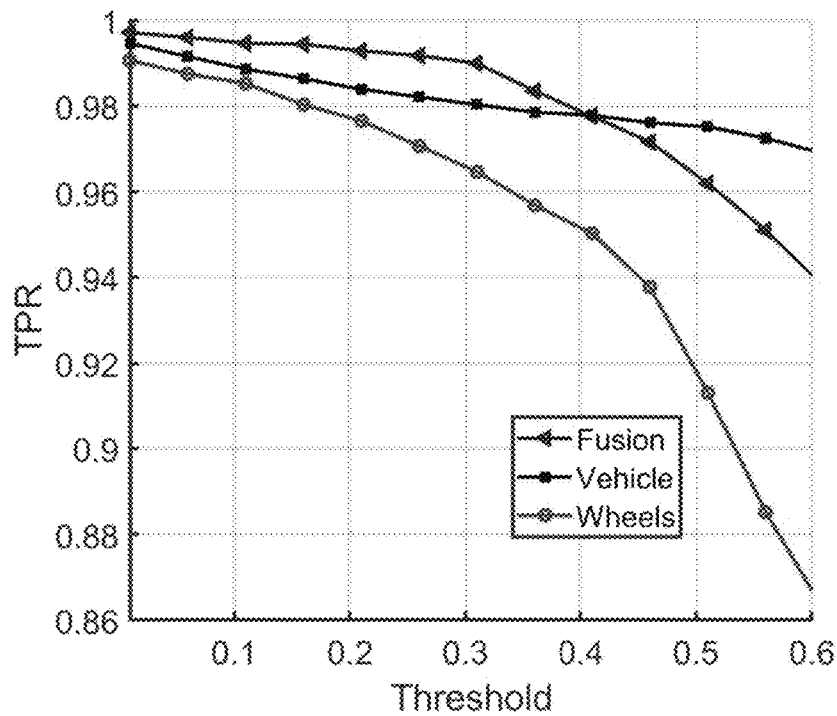
FIG. 12 illustrates a graph of baseline, vehicle, and wheel-network-matching true positive rates.
Figure 13:
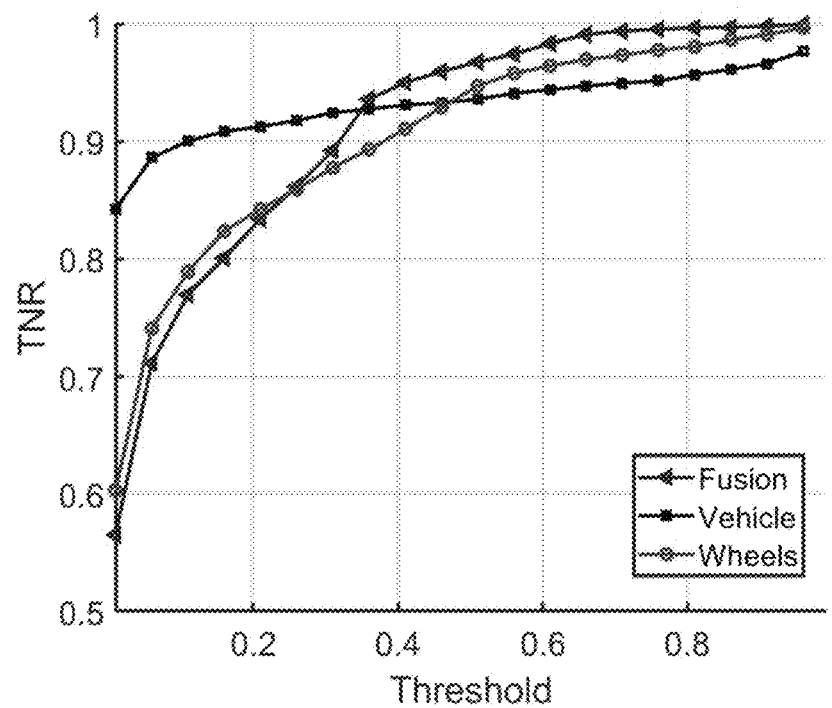
FIG. 13 illustrates a graph of baseline, vehicle, and wheel-network matching true negative rates.

FIGS. 11-13 show comparisons between the baseline, vehicle, and wheel matching accuracy, true positive rate, and true negative rate for distinct threshold values. Specifically, FIG. 11 illustrates a comparison of the fusion baseline, vehicle, and wheel-matching accuracies for different thresholds. FIG. 12 illustrates a comparison of the fusion baseline, vehicle, and wheel-matching true positive rate for different thresholds. FIG. 13 illustrates a comparison of the fusion baseline, vehicle, and wheel-matching true negative rate for different thresholds. From the results, it can be concluded that combining the decisions from the vehicle and wheel matching network enhances the matching performance at some operating thresholds. The baseline approach leverages the complementary information from the wheels and provides a more accurate performance in comparison to using the vehicle images alone.

Figure 14:
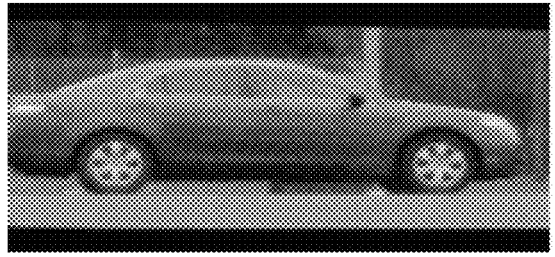
FIG. 14 illustrates two side vehicle images compared utilizing one embodiment of the automatic vehicle matching of the present disclosure.
Figure 14:
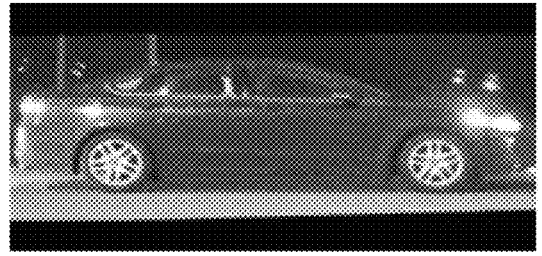
Figure 15:
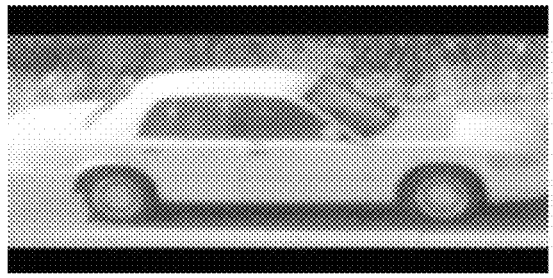
FIG. 15 illustrates two additional side vehicle images compared utilizing one embodiment of the automatic vehicle matching of the present disclosure.
Figure 15:
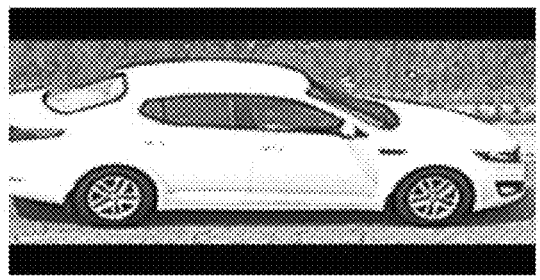
Figure 16:
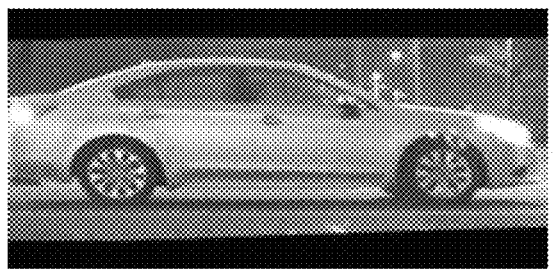
FIG. 16 illustrates two additional side vehicle images compared utilizing one embodiment of the automatic vehicle matching of the present disclosure.
Figure 16:
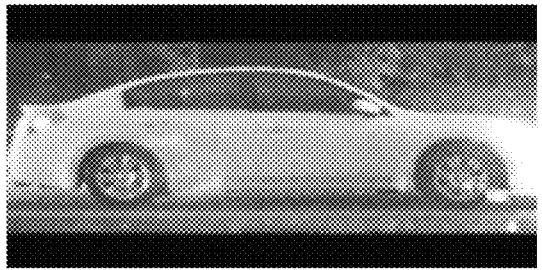

Some illustrative matching instances are shown in FIGS. 14-16 that highlight the utility of the wheel matching. The two vehicle images in FIG. 14 have a vehicle similarity score of 0.958 and wheel similarity scores of 0.01, 0.001. The two vehicle images in FIG. 15 have a vehicle similarity score of 0.64 and wheel similarity scores of 0.02, 0.01. The two vehicle images of FIG. 16 have a vehicle similarity score of 0.91 and wheel similarity scores of 0.01, 0.03. Although each pair of vehicles represents a negative match, e.g., two different vehicles, the whole-vehicle similarity scores are above the threshold, which, by themselves, indicates that they are positive matches. On the other hand, the wheel similarity scores are below the threshold, which suggests a negative match. These examples show the utility of including wheel-specific similarities along with the whole-vehicle similarity to improve matching accuracy.

While the baseline fusion average is reasonable, a deep decision fusion network can provide improved accuracy. Using both the vehicle and the wheel similarity scores, a multi-layered, fully connected network can be trained that combines the scores and provides a final decision. In essence, this is combining the three scores (whole-vehicle similarity and both wheel similarities) by performing a smart weighted averaging of the decisions from the wheel and vehicle matching networks.

Figure 17:
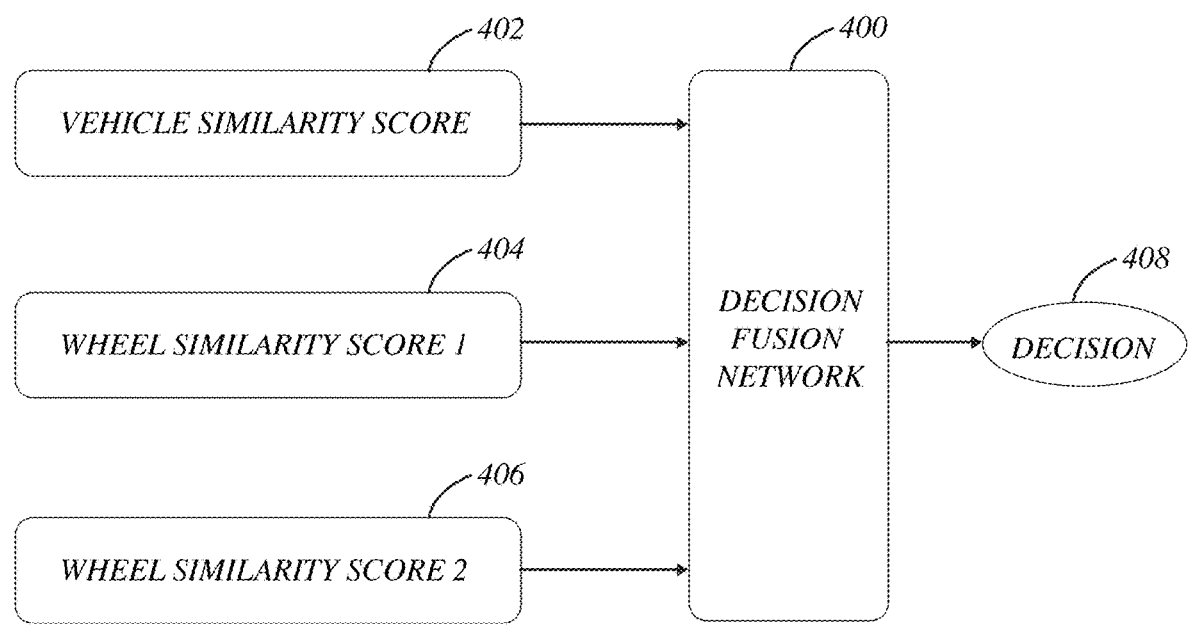
FIG. 17 illustrates a representative block diagram of a decision fusion network in accordance with an embodiment of the present disclosure.

FIG. 17 shows a representative block diagram for an implementation of one embodiment of a deep fusion network 400 in accordance with the present disclosure. The vehicle similarity score 402, back wheel similarity score 404, and the front wheel similarity score 406 are input into the decision fusion network 400, which provides a binary output decision 408 and/or a fused similarity score indicating whether the two vehicle images match. This exemplary network 400 can be composed of four fully connected layers. The structure of the network of the current embodiment is depicted in Table 5.

TABLE 5

| Layer | Structure | Activation |
| --- | --- | --- |
| 1 | 100 | Relu |
| 2 | 70 | Relu |
| 3 | 20 | Relu |
| 4 | 1 | Sigmoid |

The inputs to the network are the three similarity scores, and the output is the fused similarity score.

Matching scores from the original validation set can be split into training (e.g., 70%) and testing (e.g., 30%) datasets. The fusion training set can have a certain number of pairs of vehicles (e.g., 6265), and the fusion testing set can have a certain number of pairs of vehicles (e.g., 2685). The network can be trained for a certain number of epochs (e.g., 500 epochs). The performance of the deep fusion network can be tested/validated on the fusion testing set. In testing the training accuracy of the current embodiment accuracy was about 98.47%. The performance of the decision fusion network of the current embodiment is compared to the baseline, soft voting, and majority voting performances on the testing set. Using a 95% confidence interval, the results are depicted in Table 6.

TABLE 6

|  | Fusion Network % | Soft Voting % | Baseline % | Majority Voting % | Vehicle Score % | Wheel Scores % |
| --- | --- | --- | --- | --- | --- | --- |
| Performance | 97.77 ± 0.56 | 97.28 ± 0.62 | 96.31 ± 0.71 | 95.68 ± 0.77 | 95.46 ± 0.79 | 92.93 ± 0.97 |

Figure 18:
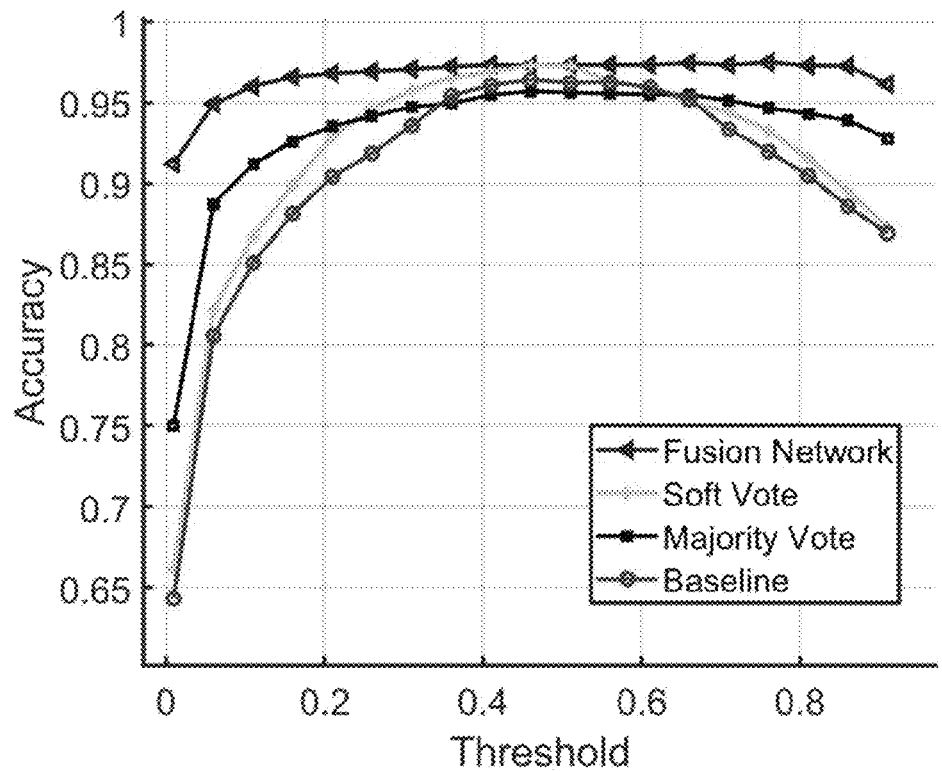
FIG. 18 illustrates a graph of baseline, majority vote, soft vote, and fusion network matching accuracy.
Figure 19:
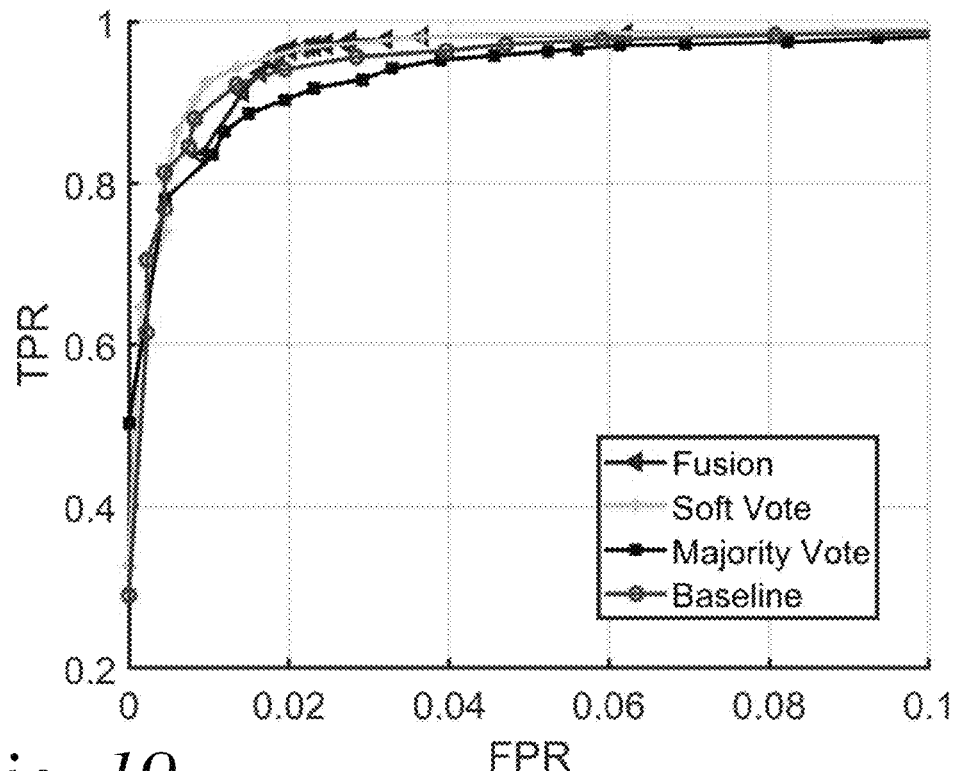
FIG. 19 illustrates receiver operating characteristic curves for the baseline, majority vote, soft vote, and fusion network.

This comparison shows the advantage of using a decision fusion deep learning method to intelligently combine the three similarity scores. FIG. 18 illustrates a comparison among the fusion network, majority voting, and baseline matching accuracy for distinct threshold values. In addition, the ROC Curves are shown in FIG. 19.

In accordance with the present disclosure a deep neural network approach for decision fusion to match pairs of vehicles through recovering feature signatures from vehicle imagery using Siamese networks is provided. After training the vehicle and the wheel matching networks, the learned networks can be utilized to match new observed data. By leveraging pattern information specific to the wheels, supplementary information about the vehicles in question is provided that can enhance the accuracy of the vehicle matching. That is, the present disclosure provides a significant improvement in the matching accuracy after fusing the similarity scores from pairs of vehicles and their corresponding wheels' signatures. Further, the systems and methods of the current disclosure perform well under diverse illumination conditions.

Embodiments of the present disclosure can enable use of vehicle imagery collected in various fields (e.g., collected by fixed or temporary camera setups or by drones) for vehicle matching. Drone images may provide supplementary information about the vehicles in question; for example, two similar vehicles can be distinguished if their angled or elevated views reveal distinguishing differences. Moreover, on-demand data acquisition by drones may be more flexible than other traditional methods. In addition, additional sources of information can be fused, such as those describing other distinctive regions of the vehicle.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system for matching vehicles, the system comprising: a hardware processor configured to
    access an image that shows a side of a target vehicle,
    detect in the side image of the target vehicle a front wheel or a back wheel or both, and form corresponding images of the wheels of the target vehicle,
    receive one or more images, each image showing a side of a respective vehicle, and for each image
        compare the side image of the vehicle and the side image of the target vehicle using a whole vehicle matching network to produce a whole-vehicle similarity score,
        detect in the side image of the vehicle a front wheel or a back wheel or both, and form corresponding images of the wheels of the vehicle,
        compare the image of the vehicle front wheel and the image of the target vehicle front wheel using a front wheel matching network to produce a front wheel similarity score, and/or compare the image of the vehicle back wheel and the image of the target vehicle back wheel using a back wheel matching network to produce a back wheel similarity score,
        combine the whole-vehicle similarity score with either the front wheel similarity score or the back wheel similarity score or both to produce an overall similarity score, and
        determine whether the vehicle matches the target vehicle if the overall similarity score meets a predetermined similarity score threshold.

2. The system of claim 1, wherein to produce the overall similarity score, the hardware processor configured to compute an average of the whole vehicle similarity score and either the front wheel similarity score or the back wheel similarity score or both.

3. The system of claim 1, wherein to produce the overall similarity score, the hardware processor configured to compute a weighted average of the whole vehicle similarity score and either the front wheel similarity score or the back wheel similarity score or both.

4. The system of claim 1, wherein the whole vehicle matching network used by the hardware processor comprises a Siamese network.

5. The system of claim 4, wherein the hardware processor is configured to train and operate the whole vehicle matching network, the whole vehicle matching network including two identical branches each having a plurality of layers with rectified linear activation functions wherein a max pooling step is applied after each of the plurality of layers, the whole vehicle matching network further including a differencing phase where the output of the two branches are subtracted from each other to generate a differenced output, the whole vehicle matching network further including a matching component including a plurality of layers with rectified linear activation functions that operates on the differenced output to generate a similarity score.

6. The system of claim 1, wherein the front wheel matching network and the back wheel matching network used by the hardware processor each comprises a Siamese network.

7. The system of claim 6, wherein the hardware processor is configured to train and operate the front wheel matching network and the back wheel matching network, the front wheel matching network and back wheel matching network being a Siamese network including two identical branches each having a plurality of layers with rectified linear activation functions, the Siamese network further including a differencing phase where the output of the two branches are subtracted from each other to generate a differenced output, the Siamese network further including a dense layer with a sigmoid activation function that operates on the differenced output to generate a wheel similarity score.

8. The system of claim 1, wherein the hardware processor is configured to
    detect in vehicle side images a front wheel or a back wheel or both, and
    form corresponding wheel images by pre-process wheel locking.

9. The system of claim 1, comprising
    one or more cameras configured to acquire the side images of the respective vehicles,
    wherein the hardware processor is configured to receive the side images of the respective vehicles from the cameras.

10. The system of claim 1, comprising
a storage module; and
a network interface configured to
receive the target vehicle side image over a network, and
save the target vehicle side image to the storage module,
wherein the hardware processor is configured to save the target vehicle wheel images to the storage module.

11. The system of claim 10, wherein the hardware processor, the storage module, and the network interface are disposed in a vehicle.

12. A method for matching vehicles, the method comprising:
receiving a target vehicle image depicting a side view of a target vehicle;
detecting, with a hardware processor, in the side view of the target vehicle in the target vehicle image a vehicle wheel and forming an image of the detected vehicle wheel of the target vehicle;
receiving a test vehicle image depicting a side view of a test vehicle;
comparing, with a hardware processor, the side view of the target vehicle in the target vehicle image and the side view of the test vehicle in the test vehicle image using a whole vehicle matching network to produce a whole-vehicle similarity score;
detecting, with a hardware processor, in the side view of the test vehicle in the test vehicle image a vehicle wheel and forming an image of the detected vehicle wheel of the test vehicle;
comparing the image of the test vehicle wheel and the image of the target vehicle wheel using a wheel matching network to produce a wheel similarity score;
fusing the whole-vehicle similarity score with the wheel similarity score to produce a fused vehicle similarity score; and
determining whether the test vehicle matches the target vehicle.

13. The method of claim 12, wherein producing the fused similarity score includes computing an average of the whole vehicle similarity score and the wheel similarity score.

14. The method of claim 12, wherein producing the fused similarity score includes computing a weighted average of the whole vehicle similarity score and the wheel similarity score.

15. The method of claim 12, wherein the whole vehicle matching network used by the hardware processor comprises a Siamese network.

16. The method of claim 15, wherein the hardware processor is configured to train and operate the whole vehicle matching network, the whole vehicle matching network including two identical branches each having a plurality of layers with rectified linear activation functions wherein a max pooling step is applied after each of the plurality of layers, the whole vehicle matching network further including a differencing phase where the output of the two branches are subtracted from each other to generate a differenced output, the whole vehicle matching network further including a matching component including a plurality of layers with rectified linear activation functions that operates on the differenced output to generate a similarity score.

17. The method of claim 12, wherein the wheel matching network used by the hardware processor is a Siamese network.

18. The method of claim 17, wherein the hardware processor is configured to train and operate the Siamese network, the Siamese network including two identical branches each having a plurality of layers with rectified linear activation functions, the Siamese network further including a differencing phase where the output of the two branches are subtracted from each other to generate a differenced output, the Siamese network further including a dense layer with a sigmoid activation function that operates on the differenced output to generate a wheel similarity score.

19. The method of claim 12, wherein the detecting in the target vehicle image includes:
detecting, with a hardware processor, in the side view of the target vehicle in the target vehicle image a front target vehicle wheel and a back target vehicle wheel, and forming respective images of the detected vehicle wheels of the target vehicle; and wherein the detecting in the test vehicle image includes:
detecting, with a hardware processor, in the side view of the test vehicle in the test vehicle image a front test vehicle wheel and a back test vehicle wheel, and forming respective images of the detected vehicle wheels of the test vehicle.

20. The method of claim 19, wherein the forming of respective images of the detected vehicle wheels of the target vehicle and the forming of respective images of the detected vehicle wheels of the test vehicle include forming wheel images by pre-process wheel locking.

* * * * *